United States Patent [19]

Ronning

[11] 4,239,719
[45] Dec. 16, 1980

[54] METHOD FOR CONTINUOUS PRODUCTION OF CORRUGATED SHEETS

[75] Inventor: Asbjorn Ronning, Sandefjord, Norway

[73] Assignee: Steni A/S, Sandefjord, Norway

[21] Appl. No.: 818,851

[22] Filed: Jul. 25, 1977

Related U.S. Application Data

[63] Continuation of Ser. No. 592,933, Jul. 3, 1975, abandoned.

[30] Foreign Application Priority Data

Jul. 11, 1974 [NO] Norway .................................. 742529

[51] Int. Cl.³ .......................... B29D 3/02; B29G 5/00
[52] U.S. Cl. ..................................... 264/137; 264/257; 264/286
[58] Field of Search .............. 264/131, 136, 137, 286, 264/287, 134, 257; 156/210, 462, 205–208; 226/88, 104–107; 425/369, 396, 370; 428/182; 118/32, 68; 427/385 R, 394, 395

[56] References Cited

U.S. PATENT DOCUMENTS

| | | | |
|---|---|---|---|
| 1,125,910 | 1/1915 | Parkes | 226/106 |
| 1,839,200 | 1/1932 | Clarke | 264/284 |
| 2,053,361 | 9/1936 | Benner et al. | 118/32 |
| 2,556,504 | 6/1951 | Prestwich | 264/137 X |
| 2,814,192 | 11/1957 | Brunner | 226/105 |
| 2,968,335 | 1/1961 | Monaco et al. | 264/286 |
| 3,077,000 | 2/1963 | Huisman et al. | 425/183 |
| 3,102,776 | 9/1963 | Steinmann | 264/286 |
| 3,157,551 | 11/1964 | Grandzio | 425/370 |
| 3,470,280 | 9/1969 | Munters | 264/137 X |
| 3,477,894 | 11/1969 | Graff | 264/286 X |
| 3,540,079 | 11/1970 | Bush | 264/286 X |
| 3,969,473 | 7/1976 | Meek | 264/286 X |

FOREIGN PATENT DOCUMENTS

| | | | |
|---|---|---|---|
| 241690 | 8/1960 | Australia . | |
| 1141077 | 12/1962 | Fed. Rep. of Germany | 264/286 X |
| 1296347 | 5/1969 | Fed. Rep. of Germany | 156/462 |
| 1629147 | 2/1971 | Fed. Rep. of Germany . | |
| 1153149 | 3/1958 | France . | |
| 1190398 | 10/1959 | France | 264/286 X |
| 1220899 | 1/1960 | France | 156/462 |
| 1261563 | 4/1961 | France . | |
| 1309388 | 10/1962 | France . | |
| 88571 | 1/1957 | Norway | 264/286 X |
| 113079 | 5/1968 | Norway . | |
| 398344 | 9/1932 | United Kingdom | 226/104 |

*Primary Examiner*—W. E. Hoag
*Attorney, Agent, or Firm*—Stevens, Davis, Miller & Mosher

[57] ABSTRACT

A method for continuous production of corrugated sheets of fiber-reinforced thermosetting resins, wherein a web of pre-impregnated material is corrugated by moving the web on elongated carrier elements arranged at intervals side by side. These elements are advanced along an essentially horizontal path in the corrugating zone and a subsequent heating and curing zone, and by causing the web to hang down to a desired extent between adjacent carrier elements. The carrier elements may be arranged transversely or longitudinally to the advancing direction of the web in order to obtain transverse or longitudinal corrugations. The upper surface of the web may be provided with a layer of surface protecting and decorating, crushed stone material before or after the corrugation operation.

5 Claims, 4 Drawing Figures

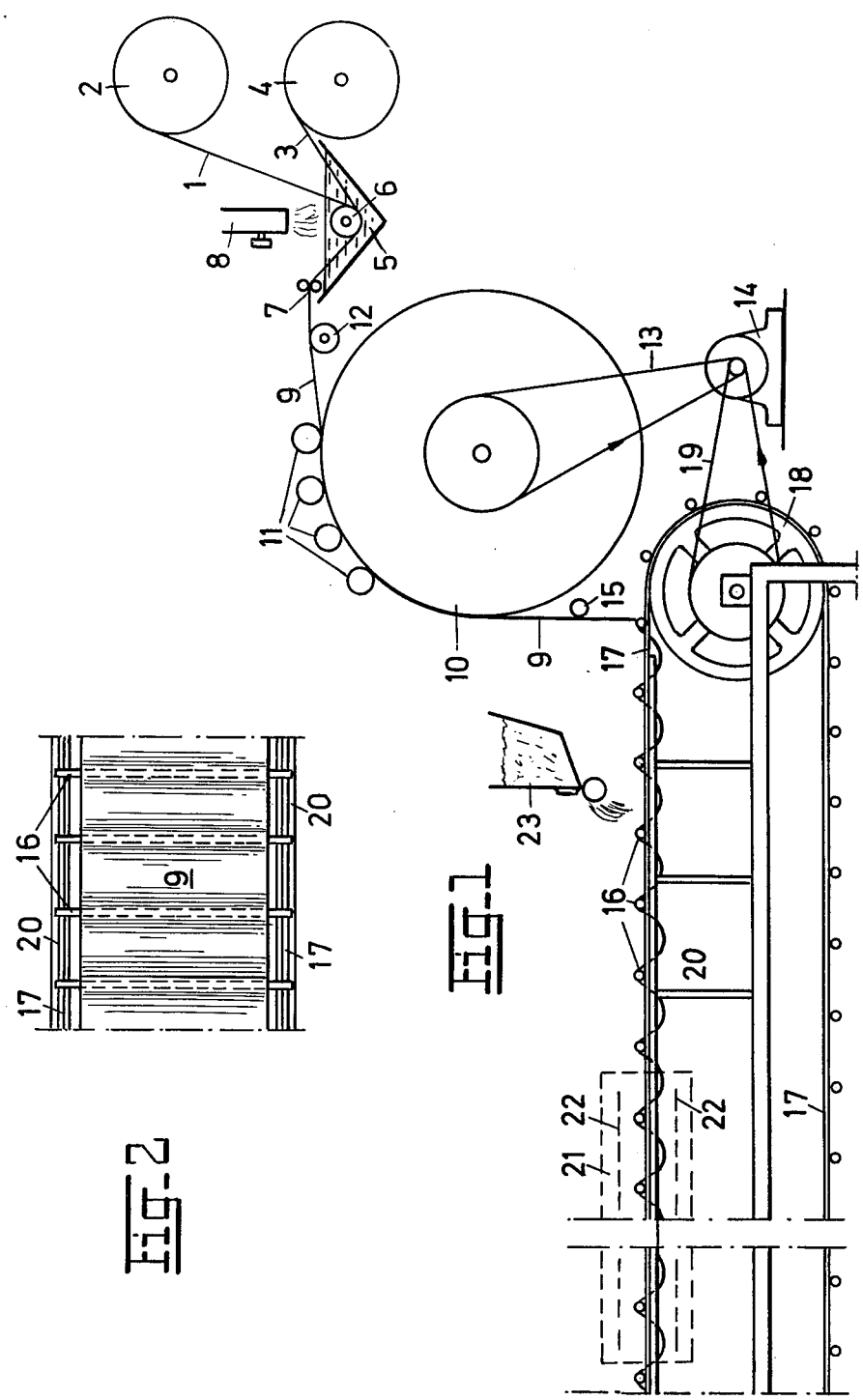

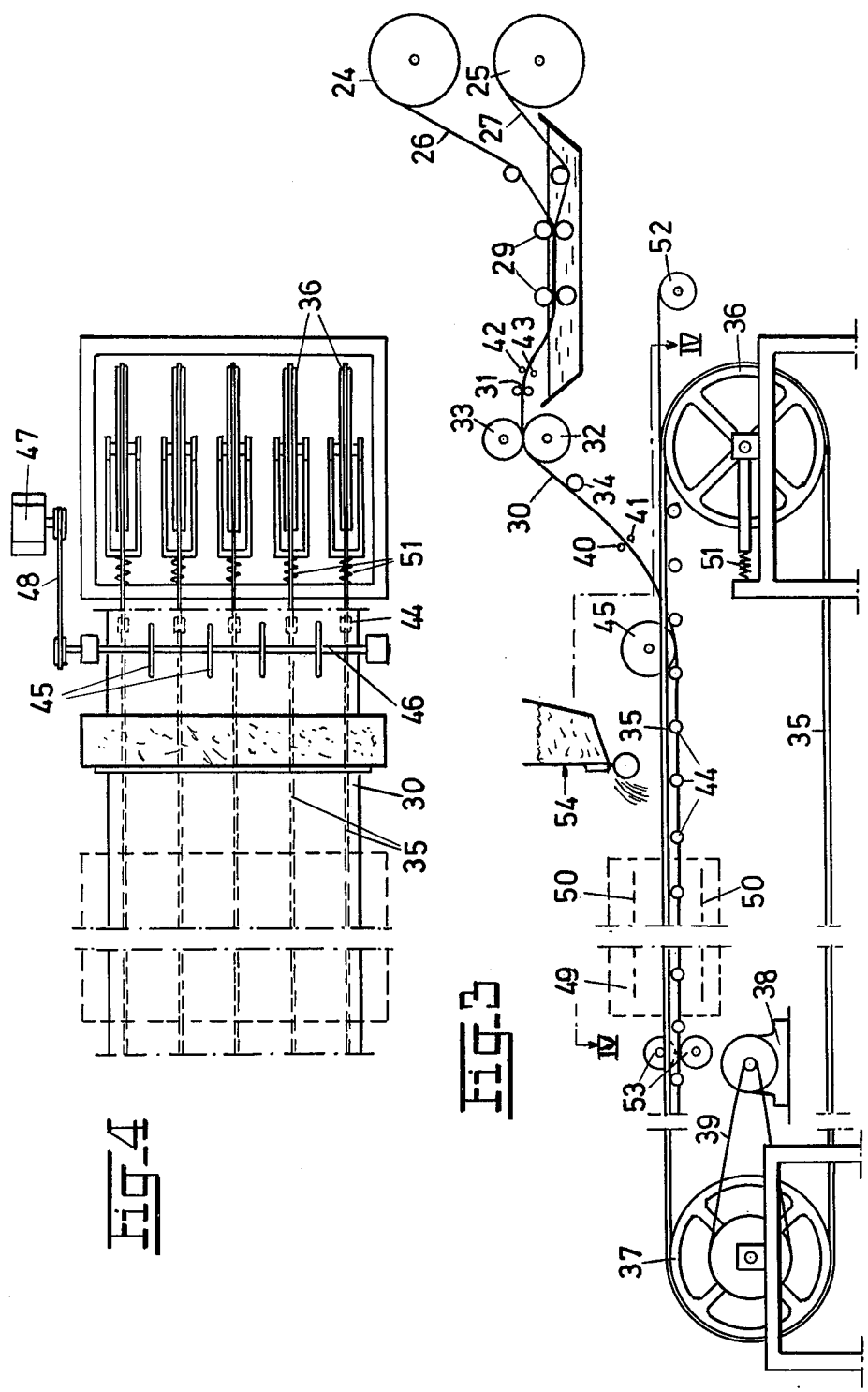

METHOD FOR CONTINUOUS PRODUCTION OF CORRUGATED SHEETS

This is a continuation of application Ser. No. 592,933 filed July 3, 1975, now abandoned.

BACKGROUND OF THE INVENTION

The present invention relates to a method of continuous production of corrugated sheets consisting of a material impregnated with a binding agent, such as a thermosetting resin, wherein a web of material after pre-impregnation is passed through a corrugating zone and subsequently through a heating and curing zone. Further, the invention relates to an apparatus for carrying out the method.

Known methods for production of such corrugated sheets or plates, e.g. facade plates for building purposes and the like, include use of cooperating rollers or toothed wheels and rollers, whereby a web of material is corrugated by being influenced by ribs or gear teeth during feeding between the cooperating rollers or toothed wheels. This method enables continuous production, but the production equipment has little flexibility with respect to possiblities for variation of corrugation pattern and degree of corrugation. Further, the use of rib rollers or toothed wheels on either side of the material web involves the necessity of using suitable intermediary layers between the ribs and the material web on both sides thereof, for example intermediary webs of cellophane extending over the entire width and length of the sheet material web.

Another common method is to use separate forms or moulds for moulding and curing of the plates. In this connection it is known to use travelling supporting or lower moulds into which the web of material is fed or pressed. This production equipment does not give any possibility for variation of the corrugation, and the method is not so rapid and rational as desirable either, as it requires heating of the moulds themselves and in addition cleaning of each separate mould after each moulding.

SUMMARY OF THE INVENTION

It is therefore an object of the invention to provide a method which enables rapid and rational production of corrugated sheets, at the same time as it gives a flexible production arrangement with the possibility for easy rearrangement or modification of the production equipment for the achievement of variation in corrugation pattern and corrugation degree.

For the achievement of the above mentioned objects there is provided a method as set forth above wherein, according to the invention, the material web after the pre-impregnation is moved on elongated carrier elements arranged at intervals side by side which elements are advanced along an essentially horizontal path in the corrugating and curing zone, and the material web carried along by the carrier elements is corrugated by causing the web to hang down to a desired extent between adjacent carrier elements.

The method of this invention is carried out by an apparatus comprising means for feeding of a suitable material web through a bath of binding agents, such as a thermo setting resin, means for impregnating the material web with said binding agent, and means for advancing said material web through a corrugating zone and further through a heating and curing zone. The corrugating zone includes a plurality of elongated carrier elements arranged at intervals side by side and being adapted to carry the material web and bring it along in an essentially horizontal path, means being provided for supporting the carrier elements and for advancing the elements, and wherein means are provided for causing suitable hanging down of the material web between adjacent carrier elements.

Further features and advantages of the invention will appear from the following description taken in conjunction with the accompanying drawings showing embodiments of the invention.

DESCRIPTION OF THE DRAWINGS

FIG. 1 is a schematic side view of a first embodiment of an apparatus for carrying out the method according to the invention;

FIG. 2 is a view along the line II—II in FIG. 1;

FIG. 3 is a schematic side view of a second embodiment of an apparatus for carrying out the method; and FIG. 4 is a view along the line IV—IV in FIG. 3.

DETAILED DESCRIPTION

In the apparatus shown in FIG. 1 a layer of glass fiber mat 1 from a storage roller 2 is fed above a carrier of glass fiber fabric 3 from a storage roller 4 into a bath of binding agent 5, preferably a thermosetting resin, such as polyester. The glass fiber mat and the glass fiber fabric are moved together and impregnated or saturated with the thermosetting resin as these webs of material are moved below a suitable roller 6 (or possibly between several cooperating roller pairs), and from there through an adjustable slot 7 determining the necessary amount of thermosetting resin. Above the binding agent vessel there is provided a device 8 for automatic filling of thermosetting resin. Instead of separate paths or webs of glass fibre mat and glass fibre fabric there may also be used a single web of glass fiber cloth or another suitable web of material, for example a web formed by spraying directly on a rotating drum.

Instead of polyester as binding agent there may also be used another type of thermosetting resin, or other suitable thermosetting binding agents.

After the material web 9 is impregnated with thermosetting resin, it is taken to a drum 10 which is shown to have relatively large diameter. In order to achieve more safe contact with the drum, there may if necessary be used a steel band over a pair of drums. In order to work out air and simultaneously create completely sliding-free contact between the material web 9 and the drum 10, a number of ribbed rollers 11 are arranged under spring pressure along the respective part of the periphery of the drum 10. For the feeding or advance of the web of material there is further shown a driven ribbed roller 12. The large drum 10 is driven by way of a driving belt 13 by means of a motor 14. For driving the ribbed rollers 11 and 12 there are provided driving means (not shown) so that these rollers and the drum 10 preferably rotate with the same peripheral speed.

The impregnated material web 9 is removed from the drum 10 by means of a fast-rotating roller 15 which is provided between the drum and the material web so that the web is just pushed out from its natural vertical fall direction from the drum. The weight of the material web, which is dependent upon the distance down to the following corrugating part of the device, will further contribute to the separation between the web and the drum.

As previously stated the apparatus comprises a plurality of elongated carrier elements which are arranged at intervals side by side and are adapted to carry the material web and bring it along in an essentially horizontal path in the corrugating and curing zones. In the illustrated embodiment the carrier elements comprise a number of rod elements 16 which are connected to a transport or conveyor device driven with constant speed, and are disposed with suitable spacing or mutual distance transversely to their direction of movement in said path. In the illustrated embodiment the conveyor device comprises a pair of mutually parallel endless bands or chains 17 running over respective pairs of chain wheels 18 with common drive. As appears from FIG. 2, the rod elements 16 are at their ends coupled to respective chains 17, for example by suitable hinge connections. The chain wheel pairs with the endless chains 17 are driven by means of the motor 14 in that this is coupled to a chain wheel pair by way of a driving belt 19. Thus, in the embodiment according to FIG. 1, the material web feeding drum 10 and the chain wheels 18 are driven by means of the same motor, and by means of suitable driving pulleys and in that the drum 10 has larger diameter than the chain wheels, one achieves that the drum is rotated with a peripheral speed which is greater than the peripherial speed of the chain wheels, and thereby a greater speed than the speed of movement of the rod elements in their path. By means of interchangeable driving pulleys, or possibly by use of separate driving motors with adjustable speed, one can achieve suitable relative regulation of the speeds of the material web feeding drum and of the conveyor chains with the carrier elements.

In order to ensure a straight path for the carrier elements suitable supporting means are provided for the carrier elements. Thus the conveyor chains are guided in shallow profiles or grooves 20. In practice the distance between the chains 17 can be up to 3 meters, essentially dependent on the available width of the material used in the web. It is advantageous that the rod elements 16 are detachably or removably coupled to the chains 17, as this the possibility for insertion of carrier elements with desired cross-section or surface profile, for thus being able to vary the corrugation pattern.

When the impregnated material web during execution of the method "falls" down or is introduced on the carrier elements in the lead-in or entrance area of the corrugating zone, the material web is hung or suspended over the successively passing carrier elements, and is corrugated in that it is caused to depend or hang down between the carrier elements and form curves or loops therebetween dependent on the constant difference in speed between the peripheral speed of the drum 10 and the speed of movement of the carrier elements. By means of said relative speed regulation there is achieved a large variation of possibilities with respect to the corrugation degree. Additional variation possibilities with respect to the appearance and pattern of the corrugation are available in that one can vary the distance between the carrier elements, and also vary the surface profile of the carrier elements, as the elements may be chosen as round tubes, or as square or angular profiles or the like. Naturally, the carrier elements must be provided with a suitable release agent.

After the formation the material web is moved through a heating and curing zone 21 (indicated by dashed lines) comprising overhead and underlying electrical heating elements, for example heat needels delivering suitable radiant heat. After passage through the curing zone the cured material web or plate is lifted from the carrier elements in order to be subsequently supplied to automatic clean-cutting machines.

Before the corrugated material web is moved into the curing zone, it can be sprinkled with different types of surface materials, for example for protection and/or decoration, such as crushed stone material in different sizes and colors. In FIG. 1 there is shown such a device 23 for supply of surface material. This material can be supplied directly on the web before or after the corrugation, as the web is not covered by any intermediate layer such as is the case with the above mentioned conventional methods with cooperating rollers.

With the embodiment described above corrugations are achieved transversely to the feeding direction of the material web. In FIGS. 3–4 there is shown an embodiment for achieving longitudinally extending corrugations on the material web. Also in this example there is shown storage rollers 24, 25 for supply of a glass fiber mat 26 and a glass fiber fabric 27 to a binding agent bath 28 containing thermosetting resin. The material web consisting of glass fiber mat and glass fiber fabric is impregnated in that it is moved between a number of cooperating, driven roller pairs 29, wherein the lower rollers are preferably bare rollers and the upper rollers are ribbed rollers. After passage of the binding agent bath the material web 30 passes an adjustable slot 31 for determining a suitable amount of thermoset. The material web is further advanced by means of a driven roller pair consisting of a lower bare roller 32 and an upper ribbed roller 33 with peripherial or longitudinally extending ribs. The roller pair 32, 33 is driven by means of a driving device which is not shown. After passage of this roller pair the material web is moved over a rapid-rotating bare roller 34 whereafter the web with a suitable slack is supplied to a corrugation zone comprising carrier elements in the form of a number of parallelly extending, endless belts or bands 35 running over associated rollers or wheel pairs 36, 37 driven by means of a suitable driving means, in this case an electric motor 38 which by way of a driving belt 39 is coupled to the wheels 37 which are preferably mounted on a common shaft.

In order to achieve a suitable slack on the material web 30 as it is supplied to the corrugating zone, there is provided a photo-cell array in the form of an upper photo-cell 40 and a lower photo-cell 41 which is connected in known manner to a suitable control system for mutual regulation or control of the movement speeds of the carrier elements and of the feeding roller pair 32, 33 after the slot opening 31. If the material web is stretched too much during the supply, the upper photo-cell 40 responds and increases the feeding speed of the rollers 32, 33 in relation to the movement speed of the carrier elements. In a similar manner a photo-cell array with an upper photo-cell 42 and a lower photo-cell 43 is arranged before the slot opening 31, in order to provide for suitable slack on the material web at this location, in that the photo-cells are connected to a control system for controlling the driving speed of the pressure roller pairs in the binding agent bath.

The endless bands 35 can consist of strong wires with circular cross-section, or they can consist of narrow steel bands with essentially rectangular cross-section. Also other surface profiles can be used to achieve the desired corrugation appearance. In order to ensure an essentially straight or horizontal path of the carrier elements in the corrugating and curing zones, supporting or guiding pulleys 44 are provided at suitable intervals along the band 35 for supporting the bands. The pulleys are suitably supported in a way not shown.

For influencing the material web 30 the desired hanging down between the element bands 35, a plurality of circular discs 45 are provided in the area wherein the material web are supplied to the carrier elements, which discs are disposed parallel to the bands and extends downwards into the respective spaces or gaps therebetween. The discs 45 are mounted on a suitably journalled, transverse shaft 46 which is coupled to a motor 47 by way of a driving belt 48. The motor 47 provides for rotation of the corrugating discs 45 with a peripheral speed corresponding to the feeding speed of the material web. The discs 45 can be made of steel and have suitable width and peripheral form for influencing the material web. It is convenient that the discs have a certain degree of tapering along the periphery, so that the binding agent material flows together again after that the discs have provided for pressing down and stretching of the material web to desired hanging down between each band or each wire. For the achievement of varying corrugation degree the shaft 46 with the discs 45 is mounted to be able to be raised or lowered. Further, for achieving the additional possibility of variation of the corrugation the wheel pairs 36, 37 are displaceably journalled so that the different wheel pairs can be readjusted towards or away from each other. The mutual distance between the corrugation discs 45 must then be able to be readjusted correspondingly.

Instead of the corrugation discs 45 which press down the material web to suitable hanging down between the carrier elements, or alternatively in combination with such discs, suitable corrugation can be achieved in that section of the carrier by use of element bands which are adapted to converge in their paths in the entrance area of the corrugating zone, thus achieving in this way gradual hanging down of the material web. In this way larger corrugation degree can be achieved, as desired formation and corrugation is achieved without the material web having to be subjected to stretching.

After the formation the material web is moved through a heating and curing zone 49 with overhead and underlying longitudinally extending electrical heat elements 50.

Because the carrier bands are subjected to heating during their passage through the heating zone 49, and therefore expand, suitable spring tensioning means 51 are provided in connection with the support of the wheels 36 at the end which is opposite to the end of the driving means. These tensioning means 51 provide for suitable tension of the bands during operation.

In order that the material web shall not adhere to the carrier element wires or stick to these after passage of the curing zone, a storage roller 52 is provided for each of the endless carrier element bands 35, the roller containing for example paper strips introduced on the bands and forming intermediate layers between the bands and the material web. In this way there is achieved easy removal of the cured plate or sheet from the band after the material web has passed the curing zone.

In order to move the cured plate or sheet forward with constant speed, a wheel pair 53 is arranged between each wire pair and is rotated with a speed corresponding to the speed of the wires by means of a driving device which is not shown.

It will be appreciated that certain of the above mentioned driving means may be driven from a common motor by utilization of suitable gears and drive transmissions. However, mutually independent drive systems must be used for the feeding or advance of the carrier elements, the feeding rollers 32, 33 and the press rollers 29, as these driving speeds are to be mutually adjustable by means of the above mentioned photo-cell devices.

In the same way as for the embodiment according to FIGS. 1-2, there is provided a device 54 for sprinkling of surface-treating material on the upper side of the material web before the material web is advanced to the heating and curing zone.

The method and apparatus described above has the essential advantage that no "moulds" in the real meaning are required. Further, large variation possibilities with respect to corrugation degree and corrugation appearance are achieved. As a result of the fact that no heating of moulds is required larger productional speed is achieved and the cleaning work also becomes insignificant.

What I claim is:

1. A method of continuous production of rigid transversely corrugated sheets comprising a material impregnated with a thermosetting binding agent, said method comprising:

impregnating a flexible sheet of material with a thermosetting binding agent;

moving an elongated substantially horizontally disposed endless carrier, having a plurality of substantially equally spaced apart transversely extending rod-like elements with no sheet-supporting structure between them, at a given adjustable linear speed;

forming corrugations, which are freely downwardly hanging only under their own weight, of desired shape in the flexible sheet between the rod-like elements in the open spaces therebetween by feeding the impregnated flexible sheet onto the moving elongated carrier at an adjustable linear speed which is greater than said given speed and by simultaneously only supporting the flexible sheet only on the rod-like elements of the moving carrier in an essentially horizontal disposition at longitudinally substantially constantly spaced intervals;

heating the still flexible corrugated sheet to cure the binding agent and rigidify the sheet while the sheet is advanced through a curing zone by said rod-like elements with the corrugations hanging freely downwardly between the rod-like elements, and removing said sheet from said carrier in rigid corrugated form.

2. The method of claim 1 in which the impregnated sheet material is moved to the horizontal carrier from an essentially vertically hanging position.

3. The method of claim 1 in which the degree of corrugation is varied by varying the difference in linear speed between the carrier and the material feed.

4. The method of claim 1 including the step of depositing a granular material on the upper surface of the impregnated sheet prior to heating the corrugated sheet.

5. A method of continuous production of rigid longitudinally corrugated sheets comprising a material impregnated with a thermosetting binding agent, said method comprising:

impregnating a flexible sheet of material with a thermosetting binding agent;

moving an elongated substantially horizontally disposed endless carrier, having a plurality of substantially equally transversely spaced apart longitudinally extending endless bands with no sheet-supporting structure between them, at a given linear speed;

depositing the impregnated flexible sheet onto the endless spaced bands of the moving carrier at a given linear speed;

forming corrugations of desired shape in the flexible sheet on the bands by only initially pressing downwardly on the material at locations at one end of the carrier between the transversely spaced endless bands;

maintaining the formed corrugations between the endless bands by only permitting the corrugations to hang freely downwardly in the free spaces between the endless bands;

heating the still flexible corrugated sheet to cure the binding agent and rigidify the sheet while the sheet is advanced through a curing zone by the endless bands with the corrugations hanging freely downwardly between the endless bands and removing said sheet from said carrier in rigid corrugated form.

* * * * *